(12) United States Patent
Bujold

(10) Patent No.: US 11,261,957 B2
(45) Date of Patent: Mar. 1, 2022

(54) SYSTEMS AND METHODS FOR OPERATING A DRIVELINE SYSTEM

(75) Inventor: Michael P. Bujold, Royal Oak, MI (US)

(73) Assignee: Orbital Traction, Ltd., Houston, TX (US)

(*) Notice: Subject to any disclaimer, the term of this patent is extended or adjusted under 35 U.S.C. 154(b) by 619 days.

(21) Appl. No.: 13/515,748

(22) PCT Filed: Dec. 13, 2010

(86) PCT No.: PCT/US2010/060021
§ 371 (c)(1),
(2), (4) Date: Dec. 5, 2012

(87) PCT Pub. No.: WO2011/081866
PCT Pub. Date: Jul. 7, 2011

(65) Prior Publication Data
US 2013/0123065 A1 May 16, 2013

Related U.S. Application Data

(60) Provisional application No. 61/286,133, filed on Dec. 14, 2009.

(51) Int. Cl.
*B60W 10/108* (2012.01)
*F16H 59/14* (2006.01)
(Continued)

(52) U.S. Cl.
CPC .......... *F16H 59/14* (2013.01); *B60W 10/06* (2013.01); *B60W 10/108* (2013.01);
(Continued)

(58) Field of Classification Search
None
See application file for complete search history.

(56) References Cited

U.S. PATENT DOCUMENTS 3,688,600 A * 9/1972 Leonard ................ F16H 37/086
475/115
6,019,695 A * 2/2000 Kobayashi ......... B60K 17/3462
180/248
(Continued)

FOREIGN PATENT DOCUMENTS

JP    WO 2005-090827 A1    9/2005
KR    WO 02/097303 A1      5/2002

OTHER PUBLICATIONS

PCT/ISA/210 International Search Report dated Aug. 10, 2011; PCT/US2010/060021.

*Primary Examiner* — Erin D Bishop
(74) *Attorney, Agent, or Firm* — Prol Intellectual Property Law, PLLC; H. Kenneth Prol

(57) ABSTRACT

Systems and methods for operating a driveline system are disclosed and include a step-variable transmission. A continuously variable transmission (CVT) is coupled between an input source and the step-variable transmission. The CVT receives a first torque from the input source and outputs a second torque. The CVT has a plurality of planetary members in rolling contact with an inner race and an outer race. A radial distance between the planetary members and a drive-transmitting member corresponds to a transmission ratio of the CVT.

11 Claims, 8 Drawing Sheets

(51) Int. Cl.
*F16H 15/50* (2006.01)
*B60W 10/06* (2006.01)
*F16H 61/04* (2006.01)
*F16H 37/02* (2006.01)
*F16H 59/18* (2006.01)
F16H 59/36 (2006.01)
F16H 63/50 (2006.01)
F16H 61/664 (2006.01)

(52) U.S. Cl.
CPC ......... *F16H 15/503* (2013.01); *F16H 37/021* (2013.01); *F16H 59/18* (2013.01); *F16H 61/04* (2013.01); *F16H 61/664* (2013.01); *F16H 63/502* (2013.01); *F16H 2037/023* (2013.01); *F16H 2037/028* (2013.01); *F16H 2059/148* (2013.01); *F16H 2059/366* (2013.01); *Y10T 477/6217* (2015.01)

(56) References Cited

U.S. PATENT DOCUMENTS

| | | | |
|---|---|---|---|
| 6,066,068 A | 5/2000 | Takemura et al. | |
| 7,125,359 B2 * | 10/2006 | Milner | F16H 15/503 475/185 |
| 2002/0055408 A1 * | 5/2002 | Shimizu | F16H 37/086 475/216 |
| 2002/0086764 A1 * | 7/2002 | Ooyama | F16H 61/6648 475/214 |
| 2007/0149341 A1 * | 6/2007 | McKenzie | F16H 61/21 475/210 |
| 2007/0254770 A1 * | 11/2007 | Vornehm et al. | 477/37 |
| 2008/0200298 A1 | 8/2008 | Suzuki | |

* cited by examiner

SYSTEMS AND METHODS FOR OPERATING A DRIVELINE SYSTEM

CROSS-REFERENCE TO RELATED APPLICATION(S)

This application is a National Stage Entry under 37 C.F.R. § 371 of International Patent Application No. PCT/US2010/060021, filed on Dec. 13, 2010, which claims priority of U.S. Provisional Application No. 61/286,133, filed on Dec. 14, 2009, the disclosures of which are hereby expressly incorporated by reference in their entirety.

TECHNICAL FIELD

This disclosure relates generally to systems including a continuously variable transmission and methods for using such systems to operate a driveline system.

BACKGROUND

Efficiency and performance can be competing goals when operating an automotive driveline system. For instance, while fuel efficiency and reduced emissions are desirable for automotive engines, power and performance are often sacrificed to achieve such characteristics. Engines and other power sources can be redesigned to improve combinations of efficiency and performance, but new designs can be expensive to test and manufacture. They also can require consumers to purchase an entire new vehicle or other non-consumable machine to obtain any benefits from a design change.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of systems and associated components.

Devices that are in operative communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. In addition, the materials, methods, and examples are illustrative only and not intended to be limiting.

Figure 1:
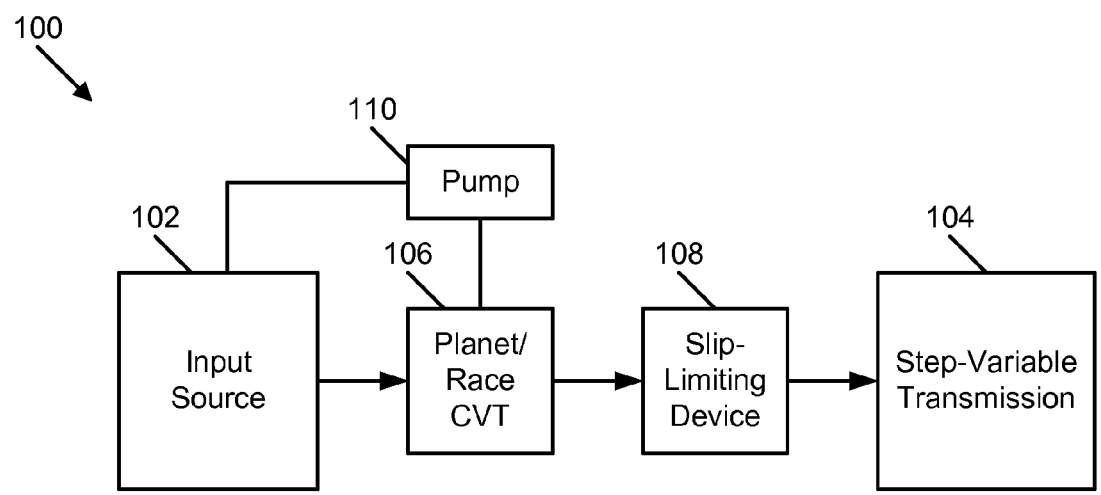
FIG. 1 is a diagram illustrating a particular embodiment of a system to operate a driveline system.

FIG. 1 illustrates a particular embodiment of a system 100 to operate a driveline system, such as a drivetrain of a car, truck, bus or other passenger vehicle, or another type of driveline system having moving parts coupled to a transmission. The system 100 includes an input source 102 that provides power, torque, or a combination thereof, to a driveline system via a step-variable transmission 104. The input source 102 can include, for instance, an internal combustion engine, an electric motor, a flywheel, another power source, or any combination thereof. The step-variable transmission can include, for example, a 3-speed, 4-speed, 5-speed, 6-speed, 21-speed, or other transmission that shifts among step-variable transmission ratios.

A continuously variable transmission (CVT) 106 is coupled between the input source 102 and the step-variable transmission 104. The CVT 106 receives a particular amount of torque from the input source 102 and outputs another amount of torque to the step-variable transmission 104. In an illustrative embodiment, a slip-limiting device 108, such as a clutch, a viscous coupling, another slip-limiting device, or any combination thereof, can be coupled between the CVT 106 and the step-variable transmission 104. The slip-limiting device 108 may decrease or otherwise change torque that is output by the CVT 106 to the step-variable transmission 104.

In another illustrative embodiment, the input source 102, the CVT 106, or any combination thereof, can be coupled to a pump 110. For instance, the CVT 106 can be coupled to the pump 110, which may be in the form of a supercharger, a turbocharger, another air compression system, or any combination thereof, which can provide compressed air to the input source 102 (such as an internal combustion engine), to manipulate an amount of power provided by the input source 102.

Figure 2:
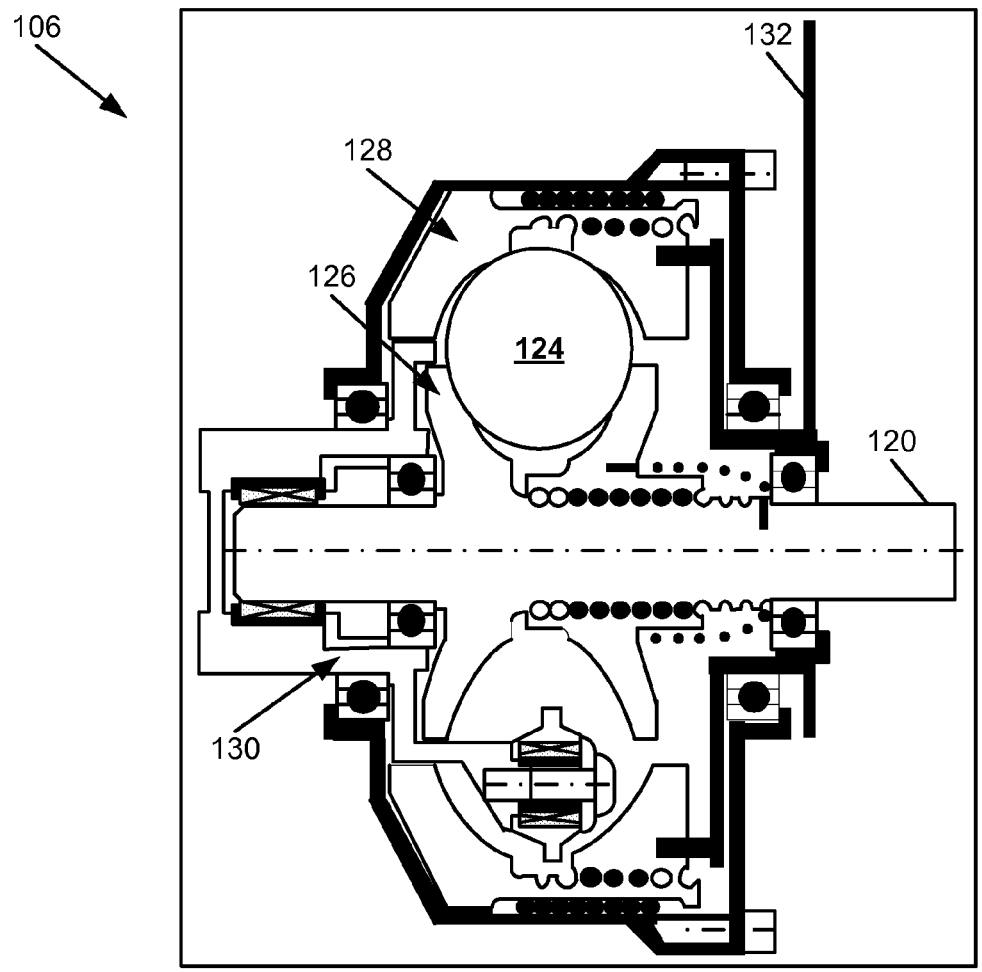
FIG. 2 is a diagram illustrating a particular embodiment of a continuously variable transmission (CVT), such as the CVT illustrated in FIG. 1.

In one embodiment, the CVT 106 can include a CVT as taught by U.S. Pat. No. 6,461,268, which is incorporated by reference in its entirety. For example, as further illustrated in FIG. 2, the CVT 106 can include a plurality of planetary members 124 in rolling contact with an inner race 126 and an outer race 128. The CVT 106 can also include a planetary gear carrier 130. A radial distance between the planetary members 124 and a drive-transmitting member 120 corresponds to a transmission ratio of the CVT 106. A variator 132 changes the current transmission ratio of the CVT 106 electrically, hydraulically, pneumatically, mechanically, or centrifugally.

An amount of power, torque, or a combination thereof, which is transmitted by the CVT 106 to the step-variable transmission 104, can be set by changing transmission of power, torque or a combination thereof, among the inner race 126, outer race 128, planetary gear carrier 130 and planetary members 124, relative to each other. In an illustrative embodiment, the CVT 106 can receive a particular amount of torque from the input source 102 via the inner race 126 and output another amount of torque to the step-variable transmission 104 via the planetary gear carrier 130. An amount of torque transmitted by the CVT 106 to the step-variable transmission 104 can be changed by transmitting power from the inner race 126 to the carrier 130, while maintaining the outer race 128 at a substantially zero rotational velocity. Movement of the outer race 128 axially can enable the planetary members 124 to move toward or away from the drive-transmitting member 120. As a result, the current transmission ratio of the CVT 106 can be partially determined by an axial position of the outer race 128, which can be manipulated by the variator 132. The torque output by the CVT 106 is approximately equal to the torque received from the input source 102, multiplied by a current transmission ratio of the CVT 106.

In another illustrative embodiment, an amount of power transmitted by the CVT 106 to the step-variable transmission 104 can be changed by transmitting power from the outer race 128 to the planetary gear carrier 130, while the inner race 126 has substantially zero rotational velocity. In still another illustrative embodiment, an amount of power transmitted by the CVT 106 to the step-variable transmission 104 can be changed by transmitting power from the inner race 126 to the outer race 128, while the planetary gear carrier 130 has substantially zero rotational velocity. Those skilled in the art will recognize that a component of the CVT 106 may change axially despite having a substantially zero rotational velocity, and the transmission ratio of the CVT 106 can be determined partially by the axial position of such component.

Figure 3:
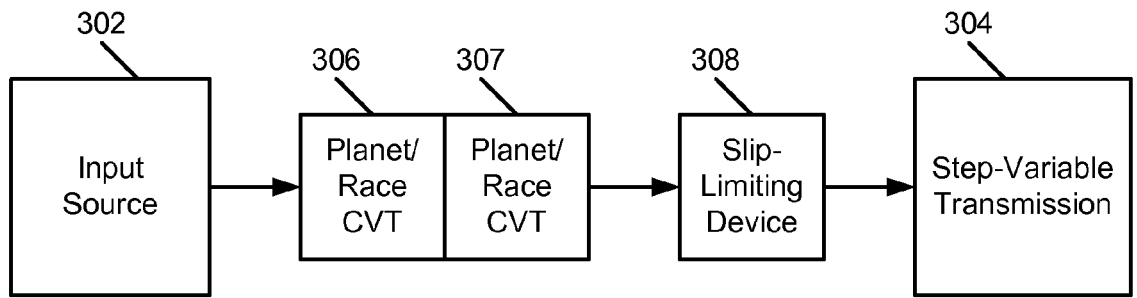
FIG. 3 is a diagram illustrating another particular embodiment of a system to operate a driveline system.
Figure 4:
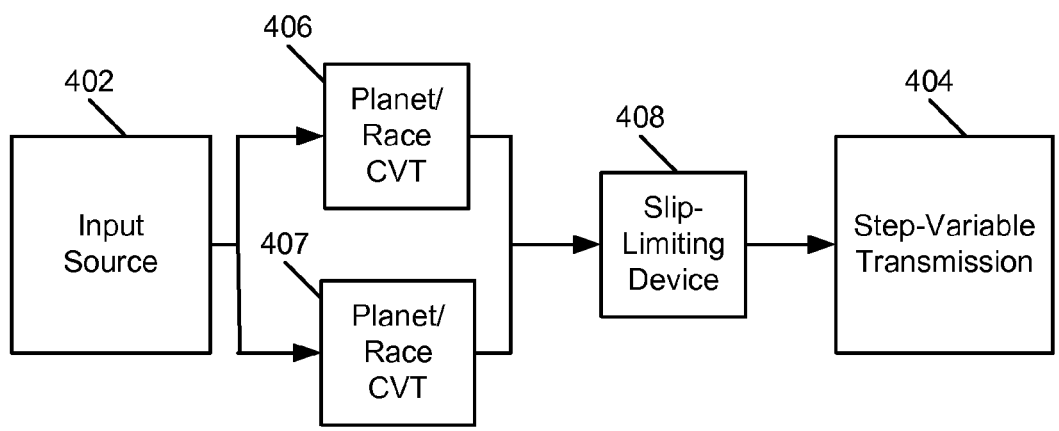
FIG. 4 is a diagram illustrating a further particular embodiment of a system to operate a driveline system.
Figure 9:
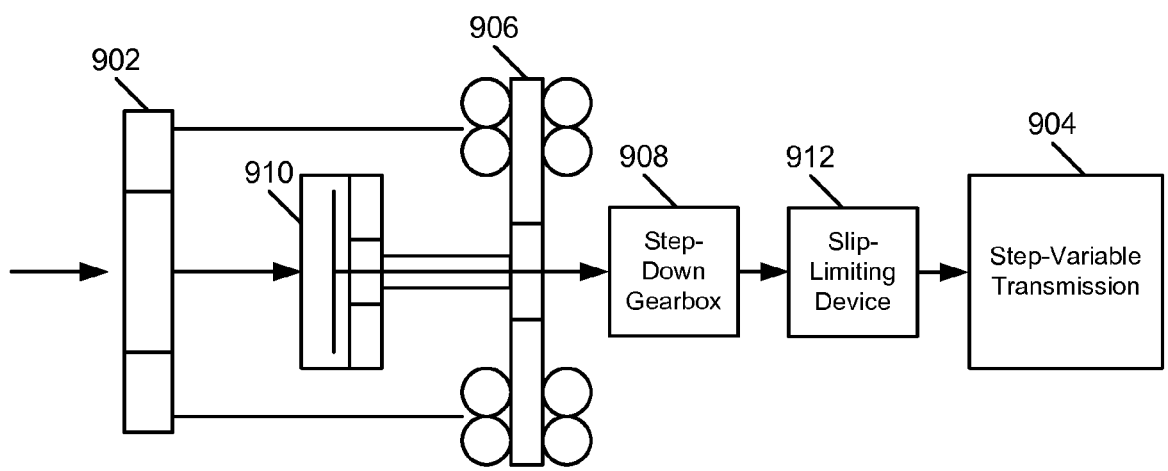
FIG. 9 is a diagram illustrating a further particular embodiment of a system to operate a driveline system.
Figure 10:
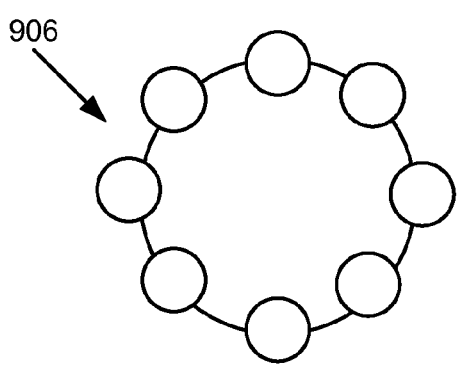
FIG. 10 is a diagram illustrating a plurality of continuously variable transmissions as illustrated in FIG. 9.

In some embodiments, a plurality of CVTs can be coupled between an input source and a step-variable transmission. For instance, as illustrated in FIG. 3, a plurality of CVTs 306 and 307 can be coupled in series between the input source 302 and the step-variable transmission 304. A slip-limiting device 308 can be coupled between a CVT 307 and the step-variable transmission 304. In another example, as illustrated in FIG. 4, a plurality of CVTs can be coupled in parallel between the input source 402 and the step-variable transmission 404. A slip-limiting device 408 can be coupled to the CVT 406 and the CVT 407, as well as the step-variable transmission 404. In one embodiment, the system can include a plurality of CVTs 906 in a carousel arrangement, as illustrated in FIGS. 9 and 10. The input sources 302 and 402 can be any of the input sources as previously described with respect to input source 102, the CVTs 306, 307, 406, and 407 can be any of the CVTs as previously described with respect to the CVT 106, the slip-limiting devices 308 and 408 can be any of the slip-limiting devices as previously described with respect to the slip-limiting device 108, and the step-variable transmissions 304 and 404 can be any of the step-variable transmissions as previously described with respect to the step-variable transmission 104.

Figure 5:
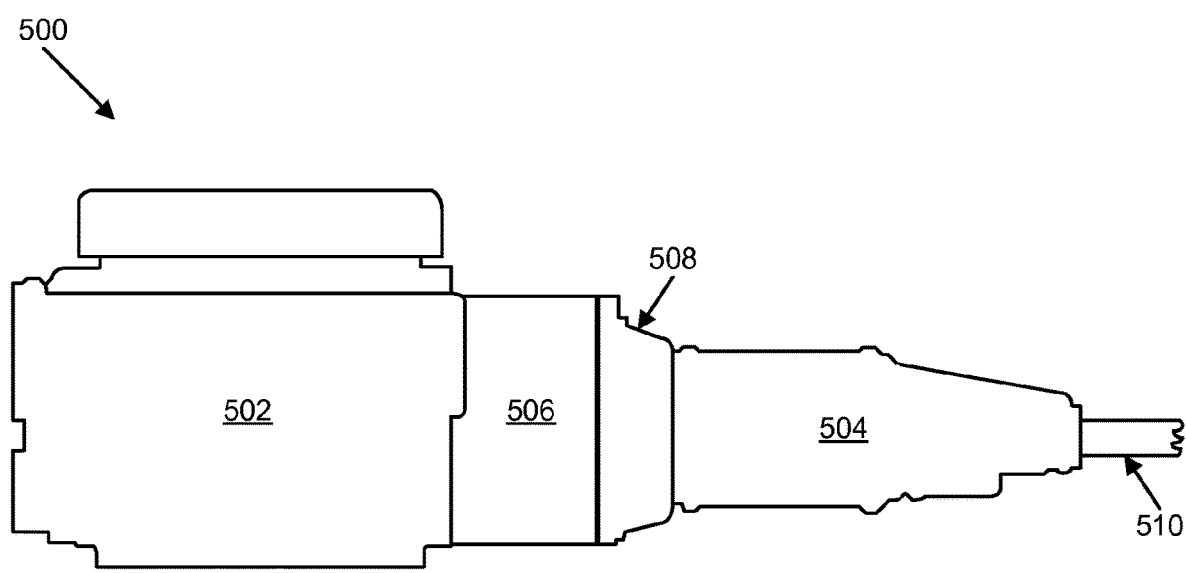
FIG. 5 is a diagram illustrating an additional particular embodiment of a system to operate a driveline system.

FIG. 5 illustrates an additional particular embodiment of a system 500 to operate a driveline. The system 500 includes an engine 502, such as an engine from a gasoline, hybrid, flywheel-powered, or other passenger vehicle, such as a car, truck, bus, military personnel carrier, or other passenger vehicle. The engine 502 is coupled to a step-variable transmission 504. A CVT 506 is coupled between the engine 502 and the step-variable transmission 504 via a clutch 508 or other slip-limiting device. The CVT 506 can be any of the CVTs as previously described with respect to the CVT 106, the slip-limiting device 508 can be any of the slip-limiting devices as previously described with respect to the slip-limiting device 108, and the step-variable transmission 504 can be any of the step-variable transmissions as previously described with respect to the step-variable transmission 104.

The step-variable transmission 504 is coupled to a driveline member 510, such as an axle. The CVT 506 receives a particular amount of torque from the engine 502 and outputs another amount of torque to the step-variable transmission 504 via the clutch 508. The step-variable transmission 504 receives the torque from the CVT 506 via the clutch 508 and transmits a proportion of the torque to the driveline member 510. The proportion of the torque transmitted by the step-variable transmission 504 to the driveline member 510 depends on a transmission ratio of the step-variable transmission 504.

Figure 6:
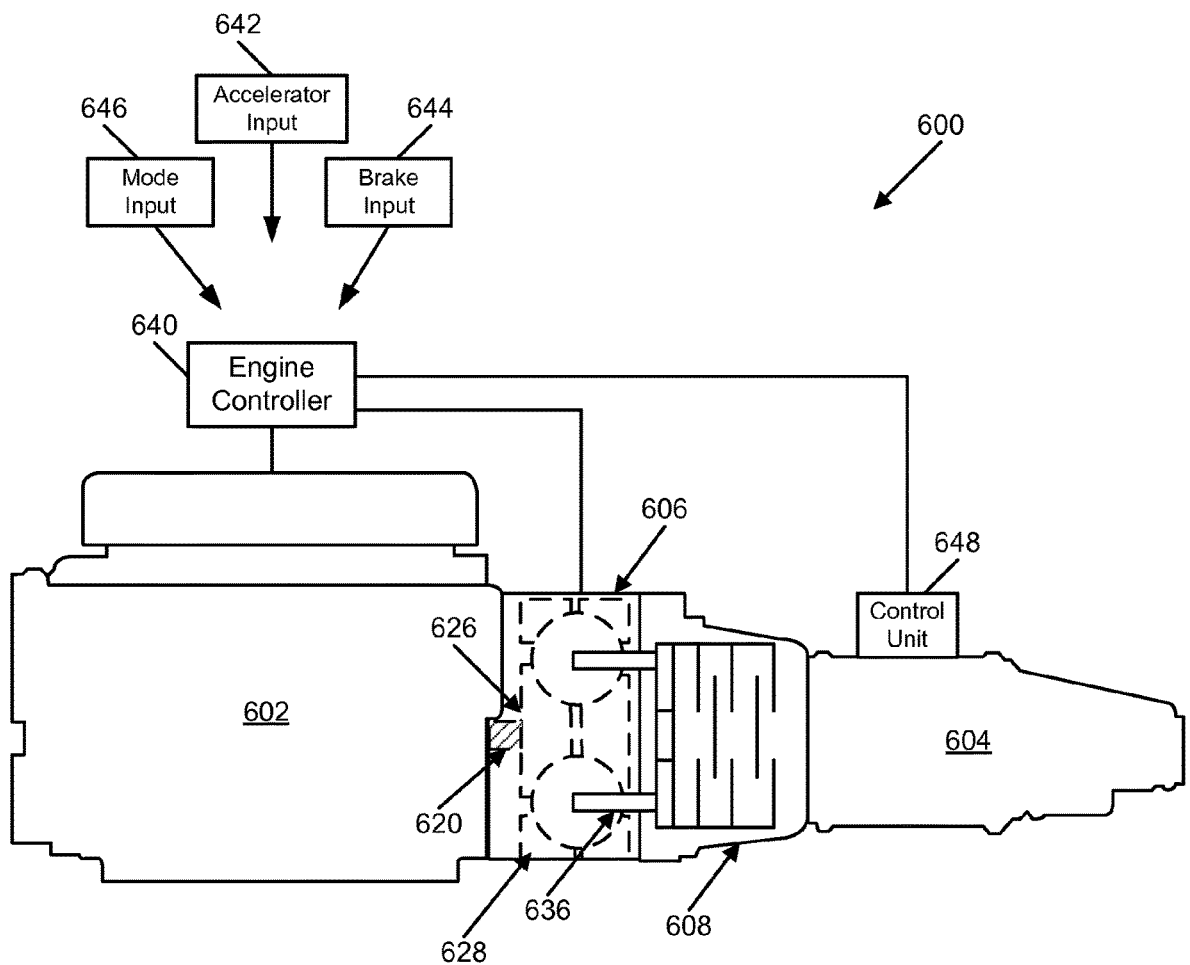
FIG. 6 is a diagram illustrating yet another particular embodiment of a system to operate a driveline system.

In an illustrative embodiment, such as the embodiment illustrated in FIG. 6, a rotatable power element 620, such as an input shaft, can be coupled to the engine 602 and to the inner race 626 of the CVT 606. Further, another rotatable power element 636, such as an output shaft, can be coupled to the clutch 608 and to a planetary gear carrier of the CVT 606, such as the planetary gear carrier 130 illustrated in FIG. 2. In addition, the engine 602 can be coupled to an engine controller 640 that communicates with the CVT 606 and the step-variable transmission 604. In one example, the engine controller 640 can communicate with a variator of the CVT 606, such as the variator illustrated at 132 in FIG. 2, with a control unit (not shown) coupled to the CVT 606, with a control unit 648 coupled to the step-variable transmission 604, or any combination thereof. The CVT 606 can be any of the CVTs as previously described with respect to the CVT 106, and the step-variable transmission 604 can be any of the step-variable transmissions as previously described with respect to the step-variable transmission 104.

In a particular embodiment, the engine controller 640 can receive a signal or other input indicating a change from a current mode to another mode. The current mode and the other mode are included in a plurality of modes, and each of the plurality of modes corresponds to a type of forward motion caused by the driveline system. The signal can correspond to a mechanical input, an electronic input, or a combination thereof. A source can include, for example, an accelerator; a sensor coupled to the accelerator; a brake pedal or brake system; a sensor coupled to the brake pedal or brake system; a mode selector, such as a sport drive selector, economy drive selector, or other mode selector; another source; or any combination thereof.

The engine controller 640 can select an engine speed associated with the other mode from a plurality of engine speeds. The engine controller 640 can determine whether a current speed of the engine 602 is approximately equal to the selected engine speed. When the current engine speed is not approximately equal to the selected engine speed, the engine controller 640 can cause the current engine speed to change to approximately the selected engine speed.

In an illustrative, non-limiting embodiment, the engine controller 640 can receive an additional input indicating that a current torque output by the step-variable transmission is to be changed to a target torque. In another embodiment, the signal indicating the change in mode can also indicate that a current torque output by the step-variable transmission is to be changed to a target torque.

When the current engine speed is approximately equal to the selected engine speed, the engine controller 640 determines whether a current transmission ratio of the CVT 606 is between a predetermined higher transmission ratio of the CVT 606 and a predetermined lower transmission ratio of the CVT 606. If the engine controller 640 determines that the current transmission ratio of the CVT 606 is between the predetermined higher transmission ratio and the predetermined lower transmission ratio of the CVT 606, the engine controller 640 causes the CVT 606 to change continuously within a range of transmission ratios of the CVT 606 until the current transmission ratio of the CVT 606 is approximately equal to, or exceeds, the predetermined higher transmission ratio of the CVT 606 (such as when the other mode corresponds to an increase in torque); until the current transmission ratio of the CVT is approximately equal to, or below, the predetermined lower transmission ratio of the CVT 606 (such as when the other mode corresponds to a decrease in torque); or until a target torque is output by the step-variable transmission 604. For instance, the engine controller 640 causes a variator of the CVT 606 to change an axial position of the outer race 628 in order to change the transmission ratio of the CVT 606.

Further, when the current transmission ratio of the CVT 606 is at the predetermined higher transmission ratio of the CVT 606 or at the predetermined lower transmission ratio of the CVT 606, and the target torque is not output by the step-variable transmission 604, the engine controller 640 causes the step-variable transmission 604 to shift from one gear to another gear. In one embodiment, the engine controller 640 sends a signal to a control unit 648 coupled to the step-variable transmission 604 indicating that the step-variable transmission 604 is to shift to the other gear. The control unit 624 sends data to the engine controller 640 indicating torque output by the step-variable transmission 604.

The engine controller 640 manipulates the CVT 606 and the step-variable transmission 604, as described above, until the target torque is output by the step-variable transmission 604. The speed of the engine 602 remains substantially constant (for example, approximately equal to the selected engine speed) as an output torque of the step-variable transmission 604 changes.

Figure 7:
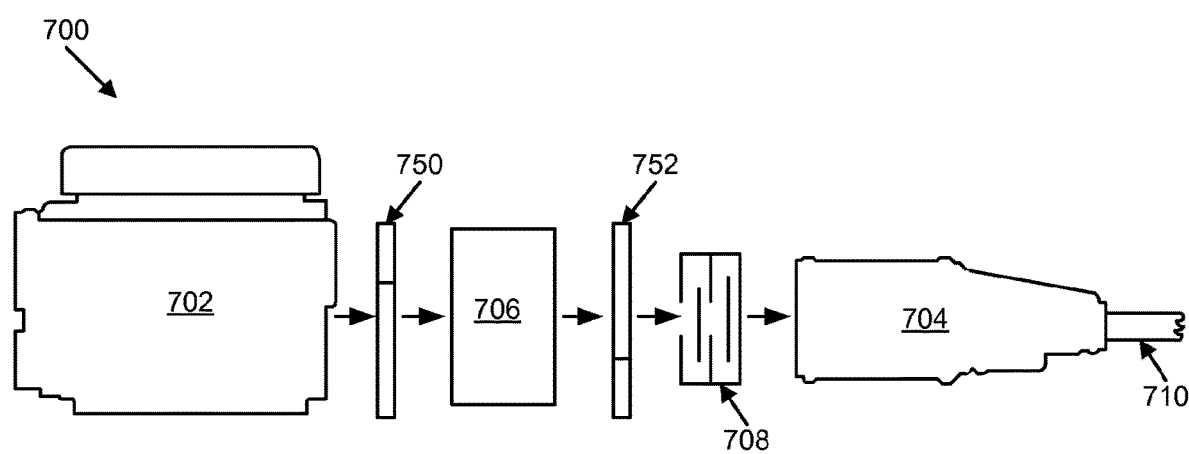
FIG. 7 is a diagram illustrating still another particular embodiment of a system to operate a driveline system.

FIG. 7 illustrates still another embodiment of a system 700 to operate a driveline system. The system 700 includes an engine 702 coupled to a step-variable transmission 704. A CVT 706 is coupled between the engine 702 and the step-variable transmission 704 via a clutch 708 or other slip-limiting device. The step-variable transmission 704 is coupled to a driveline member 710, such as an axle. The CVT 706 receives a particular amount of torque from the engine 702 and to output another amount of torque to the step-variable transmission 704 via the clutch 708. The step-variable transmission 704 transmits a proportion of the torque received via the clutch 708 to the driveline member 710, depending on a transmission ratio of the step-variable transmission 704. The CVT 706 can be any of the CVTs as previously described with respect to the CVT 106, and the step-variable transmission 704 can be any of the step-variable transmissions as previously described with respect to the step-variable transmission 104.

In this embodiment, a step-up gearbox 750 is coupled between the engine 702 and the CVT 706. The step-up gearbox 750 increases a rotational velocity transmitted by the engine 702 to the CVT 706, while decreasing the torque transmitted by the engine 702 to the CVT 706. Further, a step-down gearbox 752 is coupled between the CVT 706 and the clutch 708. The step-down gearbox 752 decreases a rotational velocity transmitted by the CVT 706 to the step-variable transmission 704 via the clutch 708, while increasing torque transmitted by the CVT 706 to the step-variable transmission 704 via the clutch 708. The use of the step-up gearbox 750, the step-down gearbox 752, or a combination thereof, can protect mechanical elements of the CVT 706 from being damaged by receiving high amounts of torque directly from the engine 702.

Figure 8:
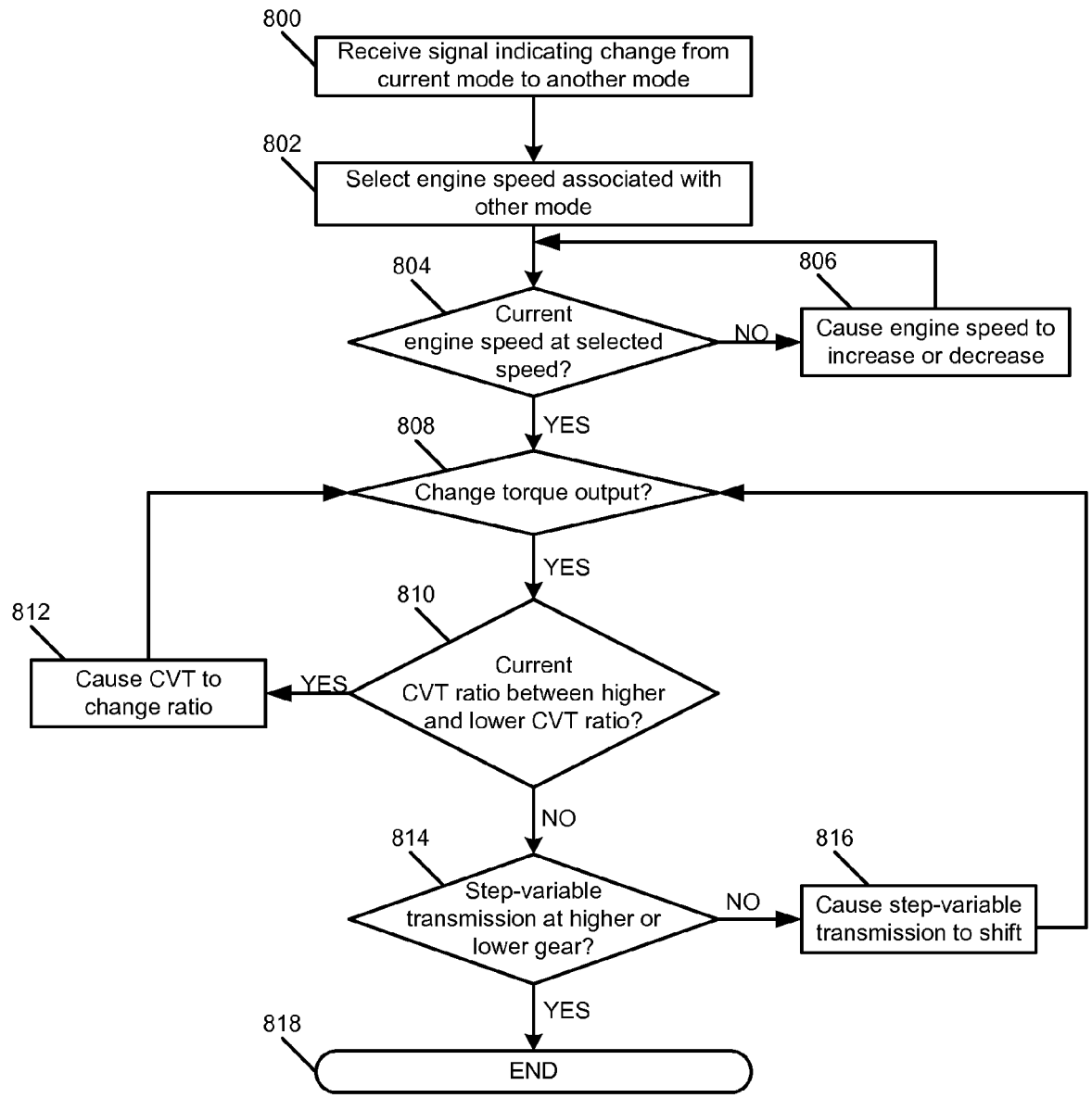
FIG. 8 is a flow diagram illustrating a method of operating a driveline system.

FIG. 8 illustrates a method of operating a driveline system. At block 800, an engine controller receives a mechanical input, an electronic input, or a combination thereof, where the input indicates a change from a current mode to another mode. The current mode and the other mode are included in a plurality of modes, and each of the plurality of modes corresponds to a type of forward motion caused by the driveline system. Particular examples of modes include a sport mode, a touring mode, an off-road mode, and an economy mode. Those skilled in the art will recognize that other modes can be used.

Moving to block 802, the engine controller selects an engine speed associated with the other mode from a plurality of engine speeds. Proceeding to decision node 804, the engine controller determines whether a current speed of the engine is approximately equal to the selected engine speed. If the engine controller determines that the current engine speed is not approximately equal to the selected engine speed, the method continues to block 806, and the engine controller causes the engine speed to increase or decrease until it is approximately equal to the selected engine speed. On the other hand, if the engine controller determines that the current engine speed is approximately equal to the selected engine speed, the method advances to decision node 808.

At decision node 808, the engine controller determines whether a torque output by a step-variable transmission is to be changed. For example, the engine controller can determine whether a torque output by the step-variable transmission is approximately equal to a target torque associated with the other mode, the selected engine speed, another factor, or a combination thereof. In another example, the engine controller can receive an additional signal, after the signal received at block 800, where the additional signal indicates that an amount of torque output by the step-variable transmission is to change to the target torque. For instance, after selection of a sport mode selector at block 800, an accelerator can be depressed, causing the additional signal to be received at the engine controller.

If the torque output by the step-variable transmission is not approximately equal to the target torque, the method moves to decision node 810, and the engine controller determines whether a current transmission ratio of a CVT is between a predetermined higher transmission ratio of the CVT and a predetermined lower transmission ratio of the CVT. If the engine controller determines that the current transmission ratio of the CVT is between the predetermined higher transmission ratio and the predetermined lower transmission ratio of the CVT, the method proceeds to block 812, and the engine controller causes the CVT to change continuously within a range of transmission ratios of the CVT until the current transmission ratio of the CVT is approximately equal to, or exceeds, the predetermined higher transmission ratio of the CVT (such as when the other mode corresponds to an increase in torque); or, until the current transmission ratio of the CVT is approximately equal to, or below, the predetermined lower transmission ratio of the CVT (such as when the other mode corresponds to a decrease in torque). The method can then return to decision node 808, and the engine controller can determine whether the torque output by the step-variable transmission is to change, such as when the step-variable transmission is not yet outputting the target torque.

Returning to decision node 810, if the engine controller determines that the current transmission ratio of the CVT is approximately equal to, or exceeds, the predetermined higher transmission ratio of the CVT, or the current transmission ratio of the CVT is approximately equal to, or below, the predetermined lower transmission ratio of the CVT, and the target torque is not output by the step-variable transmission, the method proceeds to decision node 814, and the engine controller determines whether the step-variable transmission is at, or exceeds, a predetermined higher or is at, or below, a predetermined lower gear of the step-variable transmission. If the engine controller determines that the step-variable transmission is neither at, nor exceeds, a predetermined higher and is neither at, nor below, a predetermined lower gear of the step-variable transmission, the method continues to block 816, and the engine controller causes the step-variable transmission to shift from one gear to another gear. The engine controller manipulates the CVT and the step-variable transmission, as described above, until the target torque is output by the step-variable transmission. The method terminates at 818.

FIG. 9 illustrates a further particular embodiment of a system 900 to operate a driveline system. The system 900 includes an input source 902 that provides power, torque, or a combination thereof, to a driveline system via a step-variable transmission 904. A plurality of CVT) 906 is coupled between the input source 902 and the step-variable transmission 904. In the embodiment illustrated in FIG. 9, the CVTs 906 are placed around a diameter, as further illustrated in FIG. 10, and operate in parallel. The input source 902 can be any of the input sources as previously described with respect to input source 102, the CVTs 906 can be any of the CVTs as previously described with respect to the CVT 106, the slip-limiting device 912 can be any of the slip-limiting devices as previously described with respect to the slip-limiting device 108, and the step-variable transmissions 904 can be any of the step-variable transmissions as previously described with respect to the step-variable transmission 104.

In one embodiment, a step-up gearbox 910 can be coupled to all the inputs of the CVTs 906. The step-up gearbox 910 causes the CVTs 906 to spin substantially at a same speed to distribute torque among the CVTs 906 in a substantially equal manner. In an example, the step-up gearbox increases rotational velocity transmitted to the CVTs 906 by a ratio of less than 1:1, such as less than 0.5:1, or by a ratio of approximately 0.3:1, while decreasing the torque transmitted to the CVTs 906. A step-down gearbox 912 can be connected to all the outputs of the CVTs 906 and can transmit the torque from the CVTs 906 to the step-variable transmission 904. In an example, the step-down gearbox 912 decreases a rotational velocity transmitted by the CVTs 906 to the step-variable transmission 904 by a ratio of less than 1:1, such as less than 0.75:1, or by a ratio of approximately 0.55:1 while increasing torque transmitted by the CVTs 906 to the step-variable transmission 904.

In accordance with the embodiments described herein, a system to operate a driveline system is disclosed that includes a continuously variable transmission (CVT) coupled between an input source, such as an engine, and a step-variable transmission. In one embodiment, operating ratios of a variator of the CVT are manipulated across a range, and the step-variable transmission is then shifted through one stage of gearing. The CVT is then shifted across its range again, and the step-variable transmission is shifted through another stage of gearing, and so on.

The use of the CVT allows the engine or other input source to operate at a particular speed, while torque output by the step-variable transmission to a driveline system changes. Thus, in one embodiment, the use of the CVT allows an engine control strategy to be implemented to operate the engine to achieve a desired objective. For instance, the engine can be maintained approximately at a speed that provides a desired efficiency, such as a best brake specific fuel consumption (BSFC) or another condition that allows the engine to operate at a desired fuel efficiency, emissions output, performance, or other objective.

In addition, the use of the CVT allows a current engine and step-variable transmission to be used. The engine and step-variable transmission are spaced apart from each other, and the CVT is coupled between them. As a result, the use of the CVT can be less costly than redesigning the engine, step-variable transmission, other mechanical elements, or any combination thereof, to improve efficiency, performance or a combination thereof. In one embodiment, space occupied by the CVT can be recovered by the removal of a torque converter associated with conventional step-variable transmissions. The need for such a torque converter is eliminated by the functions of the CVT.

Various elements can be combined with the CVT to produce desired results. For instance, a slip-limiting device, such as a clutch, can be coupled between the CVT and the step-variable transmission. In another embodiment, a step-up gearbox, a step-down gearbox, or a combination thereof, can be coupled to the CVT to prevent damage from torque transmitted by the input source. In yet another embodiment, the CVT can be combined with an epicyclical gearbox to effectively provide an infinitely variable transmission (IVT). An IVT is a variation of CVT in which the gearing is configured so that the transmission can go through forward, zero, and reverse rotation. In still another embodiment, a step-variable transmission can be placed between an input source (such as an engine) and a CVT, the CVT can be otherwise disposed downstream from the step-variable transmission (e.g., further from the input source than the step-variable transmission), or any combination thereof. In an example, a CVT can be disposed between the input source and step-variable transmission, and a second CVT can be disposed downstream from the step-variable transmission.

After reading this specification, skilled artisans will appreciate that the embodiments described herein illustrate only a few embodiments where a CVT can be used in conjunction with a fluid motion system. The power source to the CVT can be substantially constant or variable, and the CVT can be used to produce a substantially constant or variable output. Thus, the concepts described herein are flexible and can be configured to a variety of different applications.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a system can include a step-variable transmission. A first continuously variable transmission (CVT) can be coupled between an input source and the step-variable transmission. The first CVT can be configured to receive a first torque from the input source and to output a second torque. The first CVT can include a plurality of planetary members in rolling contact with an inner race and an outer race. A radial distance between the planetary members and a drive-transmitting member can correspond to a transmission ratio of the first CVT.

In an embodiment of the first aspect, a slip-limiting device can be coupled between the first CVT and the step-variable transmission. The slip-limiting device can include a clutch or a viscous coupling. In another embodiment of the first aspect, the input source can include an electric motor, a flywheel, an internal combustion engine, or any combination thereof. For example, the input source can include an engine of a passenger vehicle. In a further embodiment of the first aspect, the first CVT is configured to output the second torque to the step-variable transmission.

In an additional embodiment of the first aspect, an additional CVT can be coupled to the step-variable transmission. For instance, the additional CVT can be coupled in series between the first CVT and the step-variable transmission. In another example, the additional CVT can be coupled to the step-variable transmission in parallel with the first CVT. In a further embodiment of the first aspect, the input source, the CVT or a combination thereof, can be coupled to a pump.

According to a second aspect, a system can include a step-variable transmission. A continuously variable transmission (CVT) can be coupled between an engine and the step-variable transmission. The CVT can include a variator and a plurality of planetary members in rolling contact with an inner race and an outer race. A radial distance between the planetary members and a drive-transmitting member can correspond to a current transmission ratio of the CVT. The system can also include an engine controller configured to cause the variator of the CVT to change the current transmission ratio continuously between a lower transmission ratio of the CVT and a higher transmission ratio of the CVT before signaling the step-variable transmission to shift from a particular gear to another gear.

In an embodiment of the second aspect, the engine controller can be configured to maintain a speed of the engine substantially constant as an output torque of the step-variable transmission changes. In an additional embodiment of the second aspect, the inner race of the CVT is coupled to the engine and the CVT is configured to receive a first torque from the engine via the inner race. In a further embodiment of the second aspect, the CVT can include a planetary gear carrier coupled to the step-variable transmission. The CVT can be configured to output a second torque to the step-variable transmission via the planetary gear carrier, where the second torque is approximately equal to the first torque multiplied by the current transmission ratio of the CVT.

In an additional embodiment of the second aspect, the outer race of the CVT can be configured to maintain a substantially zero rotational velocity and to move axially. The current transmission ratio of the CVT can be partially determined by an axial position of the outer race. In another embodiment of the second aspect, the engine controller can be configured to communicate with an electronic control unit coupled to the CVT, the variator, the step-variable transmission, or any combination thereof. In a further embodiment of the second aspect, the variator can be configured to change the current transmission ratio of the CVT electrically, hydraulically, pneumatically, mechanically, or centrifugally. In yet another embodiment of the second aspect, the CVT can be coupled to a step-up gearbox, a step-down gearbox, or a combination thereof.

According to a third aspect, a computer-implemented method of operating a driveline system can include receiving a signal indicating a change from a first mode to a second mode. The first mode and the second mode can be included in a plurality of modes. Each of the plurality of modes can correspond to a type of forward motion caused by the driveline system. The method can also include selecting an engine speed from a plurality of engine speeds, where the selected engine speed is associated with the second mode. When a current transmission ratio of the CVT is between a predetermined higher transmission ratio of the CVT and a predetermined lower transmission ratio of the CVT, the method can include causing the CVT to change continuously within a range of transmission ratios of the CVT until (i) the current transmission ratio of the CVT is approximately equal to, or exceeds, the predetermined higher transmission ratio of the CVT, (ii) the current transmission ratio of the CVT is approximately equal to, or below, the predetermined lower transmission ratio of the CVT, or (iii) a target torque is output by the step-variable transmission. When the current transmission ratio of the CVT is approximately equal to, or exceeds, the predetermined higher transmission ratio of the CVT, or the current transmission ratio of the CVT is approximately equal to, or below, the predetermined lower transmission ratio of the CVT, and the target torque is not output by the step-variable transmission, the method can include causing the step-variable transmission to shift from a particular gear to another gear.

In an embodiment of the third aspect, the method can include detecting an additional signal indicating that a current torque output by the step-variable transmission is to be changed to the target torque.

In another embodiment of the third aspect, the method can include, before causing the CVT to change or causing the step-variable transmission to shift, determining whether a current engine speed is approximately equal to the selected engine speed. Further, the method can include, when the current engine speed is not approximately equal to the selected engine speed, causing the current engine speed to change to approximately the selected engine speed.

In a further embodiment of the third aspect, the signal indicating the change from the first mode to the second mode corresponds to a mechanical input or an electronic input. For example, the signal indicating the change from the first mode to the second mode can correspond to movement of an accelerator or manipulation of a mode selector.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    an input source;
    a step-variable transmission having a shifting clutch that may shift among plural step-variable transmission ratios;
    a first continuously variable transmission (CVT) and a torque limiter operatively coupled between the input source and the step-variable transmission, wherein
    the first CVT comprises a variator and is configured to receive a first torque from the input source and output a second torque, and
    the first CVT comprises a plurality of planetary members in rolling contact with an inner race and an outer race, and a radial distance between the planetary members and a drive-transmitting member corresponds to a transmission ratio of the first CVT; and
    an engine controller in operative communication with the step-variable transmission and the engine controller in operative communication with the first CVT to cause the variator to change the transmission ratio of the first CVT to coordinate with a gear shift of the step-variable transmission to modify torque changes output by the step-variable transmission while accommodating torque conversion from the first torque to the second torque output to the step-variable transmission.

2. The system of claim 1, wherein the controller causes the variator to change the transmission ratio of the first CVT before the gear shift of the step-variable transmission as the coordination with the gear shift of the step-variable transmission.

3. The system of claim 1, wherein the torque limiter comprises a clutch or a viscous coupling.

4. The system of claim 1, wherein the input source comprises an electric motor, a flywheel, an internal combustion engine, or any combination thereof.

5. The system of claim 4, wherein the first CVT is configured to output the second torque to the step-variable transmission.

6. The system of claim 5, wherein the input source, the first CVT, or a combination thereof is coupled to a pump.

7. The system of claim 6, further comprising an additional CVT coupled to the step-variable transmission.

8. The system of claim 7, wherein the additional CVT is coupled in series between the first CVT and the step-variable transmission.

9. The system of claim 7, wherein the additional CVT is coupled to the step-variable transmission in parallel with the first CVT.

10. The system of claim 1, wherein the input source comprises an engine of a passenger vehicle.

11. The system of claim 1, further comprising:
    the torque limiter coupled between the first CVT and the step-variable transmission, wherein the torque limiter comprises a clutch or a viscous coupling;
    an additional CVT coupled to the step-variable transmission, wherein the additional CVT is coupled to the step-variable transmission in parallel with the first CVT;
    the variator; and
    the engine controller configured to cause the variator of the CVT to change the transmission ratio of the first CVT continuously between a lower transmission ratio of the CVT and a higher transmission ratio of the CVT before signaling the gear shift of the step-variable transmission, wherein the first CVT is configured to output the second torque to the step-variable transmission, and wherein the input source comprises an electric motor, a flywheel, an internal combustion engine, or any combination thereof, and wherein the input source, the first CVT, or a combination thereof is coupled to a pump.

* * * * *